United States Patent
Tazbaz et al.

(10) Patent No.: US 10,162,389 B2
(45) Date of Patent: Dec. 25, 2018

(54) COVERED MULTI-AXIS HINGE

(71) Applicant: Microsoft Technology Licensing, LLC, Redmond, WA (US)

(72) Inventors: Errol Mark Tazbaz, Bellevue, WA (US); Brian Bitz, Sherwood, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/866,697

(22) Filed: Sep. 25, 2015

(65) Prior Publication Data

US 2017/0090523 A1    Mar. 30, 2017

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1654* (2013.01); *G06F 1/1669* (2013.01); *H04M 1/022* (2013.01)

(58) Field of Classification Search
CPC ..... G06F 1/1654; G06F 1/1669; G06F 1/1681
See application file for complete search history.

(56) References Cited

U.S. PATENT DOCUMENTS

| | | |
|---|---|---|
| 3,289,877 A | 12/1966 | Hans |
| 4,355,666 A | 10/1982 | Torii |
| 4,611,710 A | 9/1986 | Mitsufuji |
| 4,617,699 A | 10/1986 | Nakamura |
| 4,711,046 A | 12/1987 | Herrgord |
| 4,845,809 A | 7/1989 | Pillifant, Jr. |
| 5,056,192 A | 10/1991 | Grass |
| 5,229,921 A | 7/1993 | Bohmer |
| 5,448,799 A | 9/1995 | Stein, Jr. |
| 5,456,195 A | 10/1995 | Ozaku et al. |
| 5,509,590 A | 4/1996 | Medeiros, Jr. |
| 5,796,575 A | 8/1998 | Podwalny et al. |
| 5,845,366 A | 12/1998 | Kuroda |
| 5,987,704 A | 11/1999 | Tang |

(Continued)

FOREIGN PATENT DOCUMENTS

| | | |
|---|---|---|
| CN | 103291737 A | 9/2013 |
| CN | 203669484 U | 6/2014 |

(Continued)

OTHER PUBLICATIONS

Response filed Oct. 31, 2016 to the Final Office Action dated Jul. 29, 2016 from U.S. Appl. No. 14/588,138, 10 pages.

(Continued)

*Primary Examiner* — Adrian S Wilson
(74) *Attorney, Agent, or Firm* — Rainier Patents, P.S.

(57) ABSTRACT

The description relates to devices, such as computing devices that have hinged portions. One example can include a first portion and a second portion. This example can also include multiple interconnected friction engines that secure the first portion and the second portion. An individual friction engine can define an axis of rotation of the first portion relative to the second portion. The example can also include sequencing elements that control a relative order of rotation of the multiple interconnected friction engines and overlapping hinge covers that protect the multiple interconnected friction engines and stabilize the timing elements.

20 Claims, 13 Drawing Sheets

(56) References Cited

U.S. PATENT DOCUMENTS

| | | |
|---|---|---|
| 6,223,393 B1 | 5/2001 | Knopf |
| 6,421,235 B2 | 7/2002 | Ditzik |
| 6,470,532 B2 | 10/2002 | Rude |
| 6,505,382 B1 | 1/2003 | Lam et al. |
| 6,527,036 B1 | 3/2003 | Welsh |
| 6,754,081 B2 | 6/2004 | Rude et al. |
| 6,757,160 B2 | 6/2004 | Moore et al. |
| 6,831,229 B1 | 12/2004 | Maatta et al. |
| 6,952,861 B2 | 10/2005 | Ynosencia |
| 6,966,435 B2 | 11/2005 | Weiser et al. |
| 7,140,074 B2 | 11/2006 | Han et al. |
| 7,155,266 B2 | 12/2006 | Stefansen |
| 7,227,741 B2 | 6/2007 | Garel et al. |
| 7,251,129 B2 | 7/2007 | Lee et al. |
| 7,293,380 B2 | 11/2007 | Repecki |
| 7,418,766 B2 | 9/2008 | Nelson et al. |
| 7,520,025 B2 | 4/2009 | Hung |
| 7,584,524 B2 | 9/2009 | Hung |
| 7,636,985 B2 | 12/2009 | Greenbank |
| 7,758,082 B2 | 7/2010 | Weigel et al. |
| 7,966,694 B2 | 6/2011 | Estlander |
| 8,024,843 B2 | 9/2011 | Endo et al. |
| 8,032,988 B2 | 10/2011 | Lai et al. |
| 8,122,970 B2 | 2/2012 | Palen |
| 8,170,630 B2 | 5/2012 | Murayama et al. |
| 8,441,791 B2 | 5/2013 | Bohn et al. |
| 8,451,601 B2 | 5/2013 | Bohn et al. |
| 8,467,838 B2 | 6/2013 | Griffin et al. |
| 8,590,857 B2 | 11/2013 | Chen et al. |
| 8,624,844 B2 | 1/2014 | Behar et al. |
| 8,649,166 B2 | 2/2014 | Wu |
| 8,687,354 B2 | 4/2014 | Uchiyama et al. |
| 8,687,359 B2 | 4/2014 | Theobald et al. |
| 8,713,759 B2 | 5/2014 | Cai |
| 8,743,538 B2 | 6/2014 | Ashcraft et al. |
| 8,776,319 B1 | 7/2014 | Chang et al. |
| 8,796,524 B1 | 8/2014 | Deck |
| 8,797,727 B2 | 8/2014 | Ashcraft et al. |
| 8,804,324 B2 | 8/2014 | Bohn et al. |
| 8,826,495 B2 | 9/2014 | Jauvtis et al. |
| 8,843,183 B2 | 9/2014 | Griffin et al. |
| 8,854,834 B2 | 10/2014 | O'Connor et al. |
| 9,047,055 B2 | 6/2015 | Song |
| 9,243,432 B2 | 1/2016 | Lee |
| 9,268,372 B1 | 2/2016 | Hsu |
| 9,290,976 B1 | 3/2016 | Horng |
| 9,371,676 B2 | 6/2016 | Rittenhouse |
| 9,411,365 B1 | 8/2016 | Tanner et al. |
| 9,625,947 B2 | 4/2017 | Lee et al. |
| 9,625,953 B2 | 4/2017 | Bitz et al. |
| 9,625,954 B2 | 4/2017 | Campbell et al. |
| 2004/0091101 A1 | 5/2004 | Park et al. |
| 2004/0266239 A1 | 12/2004 | Kurokawa |
| 2005/0122671 A1 | 6/2005 | Homer |
| 2005/0155182 A1 | 7/2005 | Han et al. |
| 2006/0005356 A1 | 1/2006 | Amano et al. |
| 2006/0046792 A1 | 3/2006 | Hassemer et al. |
| 2006/0079277 A1 | 4/2006 | Ditzik |
| 2007/0039132 A1 | 2/2007 | Jung et al. |
| 2007/0049376 A1 | 3/2007 | Cho et al. |
| 2007/0107163 A1 | 5/2007 | Barnett |
| 2007/0117600 A1 | 5/2007 | Robertson et al. |
| 2007/0247799 A1 | 10/2007 | Nie et al. |
| 2008/0112113 A1 | 5/2008 | Sawadski et al. |
| 2008/0174089 A1 | 7/2008 | Ekberg |
| 2008/0250604 A1 | 10/2008 | Chen et al. |
| 2009/0147458 A1 | 6/2009 | Wang et al. |
| 2010/0154171 A1 | 6/2010 | Lombardi et al. |
| 2010/0232100 A1 | 9/2010 | Fukuma et al. |
| 2011/0000136 A1 | 1/2011 | Brun |
| 2011/0099756 A1 | 5/2011 | Chen |
| 2011/0177850 A1 | 7/2011 | Griffin et al. |
| 2011/0292605 A1 | 12/2011 | Chen |
| 2012/0046076 A1 | 2/2012 | Masser et al. |
| 2012/0120618 A1 | 5/2012 | Bohn |
| 2012/0120627 A1 | 5/2012 | O'connor et al. |
| 2012/0127471 A1 | 5/2012 | Urushidani |
| 2012/0137471 A1 | 6/2012 | Kujala |
| 2012/0147542 A1 | 6/2012 | Kim |
| 2012/0206893 A1 | 8/2012 | Bohn et al. |
| 2012/0272481 A1 | 11/2012 | Ahn et al. |
| 2012/0279014 A1 | 11/2012 | Carlsson |
| 2012/0307472 A1 | 12/2012 | Bohn et al. |
| 2013/0014346 A1 | 1/2013 | Ahn et al. |
| 2013/0046492 A1 | 2/2013 | Westergaard |
| 2013/0081229 A1 | 4/2013 | Hirano |
| 2013/0111704 A1 | 5/2013 | Mitsui |
| 2013/0135809 A1 | 5/2013 | Uchiyama et al. |
| 2013/0139355 A1 | 6/2013 | Lee et al. |
| 2013/0152342 A1 | 6/2013 | Ahn |
| 2013/0194741 A1 | 8/2013 | Uchiyama et al. |
| 2013/0216740 A1 | 8/2013 | Russell-Clarke |
| 2013/0219663 A1 | 8/2013 | Cai |
| 2013/0318746 A1 | 12/2013 | Kuramochi |
| 2014/0042293 A1 | 2/2014 | Mok et al. |
| 2014/0084772 A1 | 3/2014 | Zhang et al. |
| 2014/0111954 A1 | 4/2014 | Lee et al. |
| 2014/0126133 A1 | 5/2014 | Griffin et al. |
| 2014/0160055 A1 | 6/2014 | Margolis et al. |
| 2014/0174226 A1 | 6/2014 | Hsu et al. |
| 2014/0174227 A1* | 6/2014 | Hsu .................... E05D 3/14 74/98 |
| 2014/0196253 A1 | 7/2014 | Song |
| 2014/0196254 A1 | 7/2014 | Song |
| 2014/0217875 A1 | 8/2014 | Park |
| 2014/0226275 A1 | 8/2014 | Ko et al. |
| 2014/0239065 A1 | 8/2014 | Zhou et al. |
| 2014/0245569 A1 | 9/2014 | Cho |
| 2014/0246354 A1 | 9/2014 | Probst et al. |
| 2014/0287804 A1 | 9/2014 | Bohn et al. |
| 2014/0290008 A1 | 10/2014 | Hsu |
| 2014/0290009 A1 | 10/2014 | Kasai et al. |
| 2014/0338483 A1 | 11/2014 | Hsu et al. |
| 2014/0352757 A1 | 12/2014 | Ramirez |
| 2014/0360296 A1 | 12/2014 | Hsu |
| 2015/0016040 A1 | 1/2015 | Hood et al. |
| 2015/0092331 A1 | 4/2015 | Kinoshita et al. |
| 2015/0138103 A1 | 5/2015 | Nishi |
| 2015/0138712 A1 | 5/2015 | Solland |
| 2015/0153787 A1 | 6/2015 | Mok et al. |
| 2015/0176317 A1 | 6/2015 | Lee |
| 2015/0227175 A1 | 8/2015 | Motosugi |
| 2015/0277505 A1 | 10/2015 | Lim et al. |
| 2015/0277506 A1 | 10/2015 | Cheah |
| 2015/0361696 A1 | 12/2015 | Tazbaz |
| 2015/0362956 A1 | 12/2015 | Tazbaz |
| 2015/0370287 A1 | 12/2015 | Ko et al. |
| 2016/0132075 A1* | 5/2016 | Tazbaz ................ G06F 1/1681 361/679.27 |
| 2016/0132076 A1* | 5/2016 | Bitz .................... G06F 1/1681 361/679.27 |
| 2016/0139634 A1 | 5/2016 | Cho et al. |
| 2016/0139639 A1 | 5/2016 | Dash et al. |
| 2016/0147267 A1* | 5/2016 | Campbell ........... G06F 1/1681 361/679.27 |
| 2016/0187935 A1* | 6/2016 | Tazbaz ................ G06F 1/1681 361/679.03 |
| 2016/0201367 A1 | 7/2016 | Kato |
| 2016/0215541 A1* | 7/2016 | Tazbaz ..................... E05D 3/14 |
| 2016/0224072 A1 | 8/2016 | Huang et al. |
| 2016/0349026 A1 | 12/2016 | Ahn et al. |
| 2016/0357226 A1* | 12/2016 | Campbell ........... G06F 1/1681 |
| 2018/0059735 A1 | 3/2018 | Tazbaz et al. |
| 2018/0066465 A1 | 3/2018 | Tazbaz et al. |

FOREIGN PATENT DOCUMENTS

| | | | |
|---|---|---|---|
| CN | 204553530 | * | 8/2015 |
| CN | 204553530 U | | 8/2015 |
| EP | 0844357 A1 | | 5/1998 |
| EP | 1340879 A2 | | 9/2003 |
| EP | 1422593 A1 | | 5/2004 |
| EP | 1464784 A1 | | 10/2004 |

(56) References Cited

FOREIGN PATENT DOCUMENTS

| | | |
|---|---|---|
| EP | 2728433 A1 | 5/2014 |
| EP | 2765478 A2 | 8/2014 |
| EP | 2765479 A2 | 8/2014 |
| KR | 20140049911 A | 4/2014 |
| WO | 2016/077254 A1 | 5/2016 |

OTHER PUBLICATIONS

Notice of Allowability dated Oct. 24, 2016 from U.S. Appl. No. 14/555,184, 11 pages.
Corrected Notice of Allowability dated Oct. 31, 2016 from U.S. Appl. No. 14/555,184, 6 pages.
Non-Final Office Action dated Mar. 29, 2016 from U.S. Appl. No. 14/588,138, 34 pages.
International Search Report and Written Opinion dated Feb. 22, 2016 from PCT Patent Application No. PCT/US2015/064173, 13 pages.
Response filed Mar. 3, 2016 to the Non-Final Office Action dated Dec. 10, 2015 from U.S. Appl. No. 14/606,979, 16 pages.
Non-Final Office Action dated Mar. 31, 2016 from U.S. Appl. No. 14/538,786, 16 pages.
Response filed Aug. 26, 2016 to the Final Office Action dated Jun. 1, 2016 from U.S. Appl. No. 14/606,979, 15 pages.
Applicant-Initiated Interview Summary dated Aug. 29, 2016 from U.S. Appl. No. 14/606,979, 3 pages.
Non-Final Office Action and Examiner Initiated Interview Summary dated Sep. 22, 2016 from U.S. Appl. No. 14/606,979, 27 pages.
Preliminary Amendment filed Sep. 26, 2016 from U.S. Appl. No. 15/239,417, 7 pages.
Response and Demand filed Apr. 6, 2016 from PCT Patent Application No. PCT/US2015/059799, 20 pages.
"Finger Protecta", Jul. 3, 2011, retrieved from <<http://shop.stormflame.com/finger-protecta-142-p.asp>> on Sep. 9, 2014, 2 pages.
"Fingersafe", May 26, 2013, retrieved from <<http://fingersafe.com/>> on Sep. 9, 2014, 2 pages.
"Laptop Back Covers Shell for Dell 15R 5520 7520 M521R 5525 PN T87MC Laptop Hinge Cover", retrieved on Sep. 8, 2014, at <<http://www.alibaba.com/product-detail/Laptop-back-covers-shell-For-Dell_1628979107.html>>, 3 pages.
"Moving Point Hinge-Multipivot Hinge", retrieved on Oct. 9, 2014, at <<http://websystem.gismo.se/Gismo/files/1029/2.mph%2001%20introduktion.pdf>>, 6 pages.
"Polyprop Boxes Accessories", Jun. 28, 2013 retrieved from <<http://www.presentingbinders.co.uk/Polyprop_Boxes_Accessories.html>> on Sep. 10, 2014, 6 pages.
"Samet SoftCover hinge wins the Innovation Award 2013", Feb. 8, 2013, retrieved from <<http://www.kozsusanidesign.com/samet-softcover-hinge-wins-the-innovation-award-2013/>> on Sep. 9, 2014, 2 pages.
Elliott, Amy-Mae, "9 Nifty Laptop Feet to Keep Your PC Running Cool", published on Jul. 30, 2012, retrieved at <<http://mashable.com/2012/07/30/laptop-feet/>>, 26 pages.
Non-Final Office Action dated Feb. 22, 2016 from U.S. Appl. No. 14/538,775, 23 pages.
International Search Report dated Jan. 4, 2016 from PCT Patent Application No. PCT/US2015/059798, 13 pages.
Non-Final Office Action dated Dec. 10, 2015 from U.S. Appl. No. 14/606,979, 20 pages.
International Search Report dated Jan. 25, 2016 from PCT Patent Application No. PCT/US2015/060959, 11 pages.
International Search Report dated Jan. 4, 2016 from PCT Patent Application No. PCT/US2015/059799, 13 pages.
Notice of Allowance dated Jul. 14, 2016 from U.S. Appl. No. 14/555,184, 15 pages.
Final Office Action dated Jul. 29, 2016 from U.S. Appl. No. 14/588,138, 31 pages.
Corrected Notice of Allowability dated Aug. 4, 2016 from U.S. Appl. No. 14/555,184, 16 pages.
Final Office Action dated Oct. 14, 2016 from U.S. Appl. No. 14/538,775, 63 pages.
Interview Summary filed Oct. 11, 2016 from U.S. Appl. No. 14/606,979, 2 pages.
Second Written Opinion dated Oct. 10, 2016 from PCT Patent Application No. PCT/US2015/060959, 7 pages.
International Search Report and Written Opinion dated Apr. 12, 2016 from PCT Patent Application No. PCT/US2016/013815, 19 pages.
Non-Final Office Action dated Apr. 12, 2016 from U.S. Appl. No. 14/555,184, 32 pages.
Second Written Opinion dated Oct. 31, 2016 from PCT Patent Application No. PCT/US2015/059799, 8 pages.
Response filed Jun. 29, 2016 to the Non-Final Office Action dated Feb. 22, 2016 from U.S. Appl. No. 14/538,775, 12 pages.
Response filed Jun. 29, 2016 to the Non-Final Office Action dated Mar. 29, 2016 from U.S. Appl. No. 14/588,138, 10 pages.
Response and Demand filed Jun. 15, 2016 from from PCT Patent Application No. PCT/US2015/064173, 13 pages.
Response filed Jun. 29, 2016 to the Non-Final Office Action dated Apr. 12, 2016 from U.S. Appl. No. 14/555,184, 10 pages.
Response filed Jun. 30, 2016 to the Non-Final Office Action dated Mar. 31, 2016 from U.S. Appl. No. 14/538,786, 12 pages.
"System Plast LF 820 K400 Acetal Straight Running Chain, 4" Width, 120" Length, Single Hinge", Retrieved on: Sep. 10, 2015, at: <<http://www.amazon.com/System-Plast-Acetal-Straight-Running/dp/B00MJXUDIA>>.
"Plastic Slatband Chains", Retrieved on: Sep. 10, 2015, at: <<http://www.irp.co.za/wp-content/assets/LFC002-7.5-Straight-Running-Double-Hinge-Chain.pdf>>.
"Straight Running Chains", Published on: Jul. 15, 2013, at: <<http://www.ultraplastindia.corn/stainless-steel-slat-chains.html>>.
"Single and Double Hinge Type LBP (820 & 821 LBP)", Retrieved on: Sep. 10, 2015, at: <<http://www.papadopoulos-bros.gr/en/proionta/erpystries-metaforikes-tainies/erpystries/plastikes/eutheias/monou-kai-diplou-mentese-typou-lbp-820-821-lbp/>>.
"Bi-Fold Hinges", Published on: May 9, 2012, Retrieved at: <<http://catalog.monroehinge.com/category/bi-fold-hinges>>.
"Multi-Function Stainless Steel Hydraulic Shower Door Pivot Hinge", Retrieved on: Sep. 10, 2015, at: <<http://www.alibaba.com/product-detail/Multi-function-stainless-steel-hydraulic-shower_60153561047.html>>.
U.S. Appl. No. 14/538,786, Campbell, et al., "Integrated Cam Slide Sequential Hinge (Dynamic Fulcrum)", filed Nov. 11, 2014.
Article 34 Demand dated May 4, 2016 from PCT Patent Application No. PCT/US2015/059798, 17 pages.
Final Office Action dated Jun. 1, 2016 from U.S. Appl. No. 14/606,979, 48 pages.
Article 34 Demand dated Jun. 8, 2016 from PCT Patent Application No. PCT/US2015/060959, 14 pages.
Response filed Apr. 20, 2017 to the Non-Final Office Action dated Feb. 24, 2017 from U.S. Appl. No. 14/538,775, 9 pages.
Response filed Apr. 10, 2017 to the Non-Final Office Action dated Jan. 20, 2017 from U.S. Appl. No. 14/588,138, 8 pages.
Corrected Notice of Allowability dated Mar. 21, 2017 from U.S. Appl. No. 14/538,786, 10 pages.
Response filed Jan. 3, 2017 to the Final Office Action dated Oct. 14, 2016 from U.S. Appl. No. 14/538,775, 9 pages.
Second Written Opinion dated Jan. 2, 2017 from PCT Patent Application No. PCT/US2016/013815, 6 pages.
Notice of Allowance dated May 18, 2017 from U.S. Appl. No. 14/588,138, 41 pages.
International Preliminary Report on Patentability dated Apr. 4, 2017 from PCT Patent Application No. PCT/US2016/013815, 9 pages.
Non-Final Office Action dated May 25, 2017 from U.S. Appl. No. 15/239,417, 71 pages.
Final Office Action and Examiner-Initiated Interview Summary dated Mar. 15, 2017 from U.S. Appl. No. 14/606,979, 56 pages.
International Preliminary Report on Patentability dated Mar. 3, 2017 from PCT Patent Application No. PCT/US2015/060959, 7 pages.
Corrected Notice of Allowability dated Mar. 16, 2017 from U.S. Appl. No. 14/555,184, 8 pages.

(56) References Cited

OTHER PUBLICATIONS

Response filed Nov. 28, 2016 to the Written Opinion dated Apr. 12, 2016 from PCT Patent Application No. PCT/US2016/013815, 10 pages.
Corrected Notice of Allowability dated Nov. 21, 2016 from U.S. Appl. No. 14/555,184, 6 pages.
Response filed Dec. 8, 2016 to the Second Written Opinion dated Oct. 31, 2016 from PCT Patent Application No. PCT/US2015/059799, 12 pages.
International Search Report and Written Opinion dated Nov. 14, 2016 from PCT Patent Application No. PCT/US2016/048898, 16 pages.
International Preliminary Report on Patentability dated Nov. 29, 2016 from PCT Patent Application No. PCT/US2015/064173, 6 pages.
Response filed Dec. 7, 2016 to the Second Written Opinion dated Oct. 10, 2016 from PCT Patent Application No. PCT/US2015/060959, 8 pages.
Response filed Dec. 13, 2016 to the Non-Final Office Action dated Sep. 22, 2016 from U.S. Appl. No. 14/606,979, 22 pages.
Supplemental Response filed Dec. 8, 2016 to the Response filed Jun. 30, 2016 from U.S. Appl. No. 14/538,786, 8 pages.
Applicant-Initiated Interview Summary dated Dec. 20, 2016 from U.S. Appl. No. 14/538,775, 3 pages.
Corrected Notice of Allowability dated Dec. 14, 2016 from U.S. Appl. No. 14/555,184, 6 pages.
Amended claims filed Dec. 22, 2016 from PCT Patent Application No. PCT/US2015/059798, 6 pages.
Notice of Allowance dated Dec. 27, 2016 from U.S. Appl. No. 14/538,786, 54 pages.
Corrected Notice of Allowability dated Jan. 13, 2017 from U.S. Appl. No. 14/538,786, 26 pages.
Non-Final Office Action dated Jan. 20, 2017 from U.S. Appl. No. 14/588,138, 12 pages.
Notice of Allowance dated Feb. 3, 2017 from U.S. Appl. No. 14/555,184, 18 pages.
International Preliminary Report on Patentability dated Jan. 24, 2017 from PCT Patent Application No. PCT/US2015/059799, 8 pages.
International Preliminary Report on Patentability dated Jan. 30, 2017 from PCT Patent Application No. PCT/US2015/059798, 6 pages.
Final Office Action dated Feb. 24, 2017 from U.S. Appl. No. 14/538,775, 42 pages.
Corrected Notice of Allowability dated Jan. 25, 2017 from U.S. Appl. No. 14/538,786, 6 pages.
Non-Final Office Action dated Oct. 27, 2017 from U.S. Appl. No. 14/606,979, 23 pages.
Second Written Opinion dated Aug. 1, 2017 from PCT Patent Application No. PCT/US2016/048898, 9 pages.
International Search Report and Written Opinion dated Nov. 23, 2017 from PCT Patent Application No. PCT/US2017/051683, 15 pages.
Final Office Action dated Feb. 27, 2018 from U.S. Appl. No. 14/606,979, 8 pages.
International Preliminary Report on Patentability dated Jan. 2, 2018 from PCT Patent Application No. PCT/US2016/048898, 20 pages.
"360 deg Hinge Video", Retrieved From: https://www.youtube.com/watch?v=lhEczMi4nsw, Jul. 21, 2013, 1 Page.
"Special Purpose Hinges (cont.)", Retrieved From: http://hingedummy.info/specialpurposepage2.htm, Jan. 4, 2007, 2 Pages.
"Non Final Office Action Issued in U.S. Appl. No. 15/256,302", dated Jun. 9, 2017, 12 Pages.
"Final Office Action Issued in U.S. Appl. No. 15/360,652", dated May 3, 2018, 8 Pages.
"Non Final Office Action Issued in U.S. Appl. No. 15/360,652", dated Oct. 6, 2017, 10 Pages.
Smith, Daria, "Microsoft Helps HP Design New Convertible Spectre x360", Retrieved From: http://blog.parts-people.com/2015/03/03/microsoft-helps-hp-design-ne-convertible-spectre-x360, Mar. 3, 2015, 1 Page.
"Non Final Office Action issued in U.S. Appl. No. 15/360,652", dated Oct. 2, 2018, 7 Pages.

\* cited by examiner

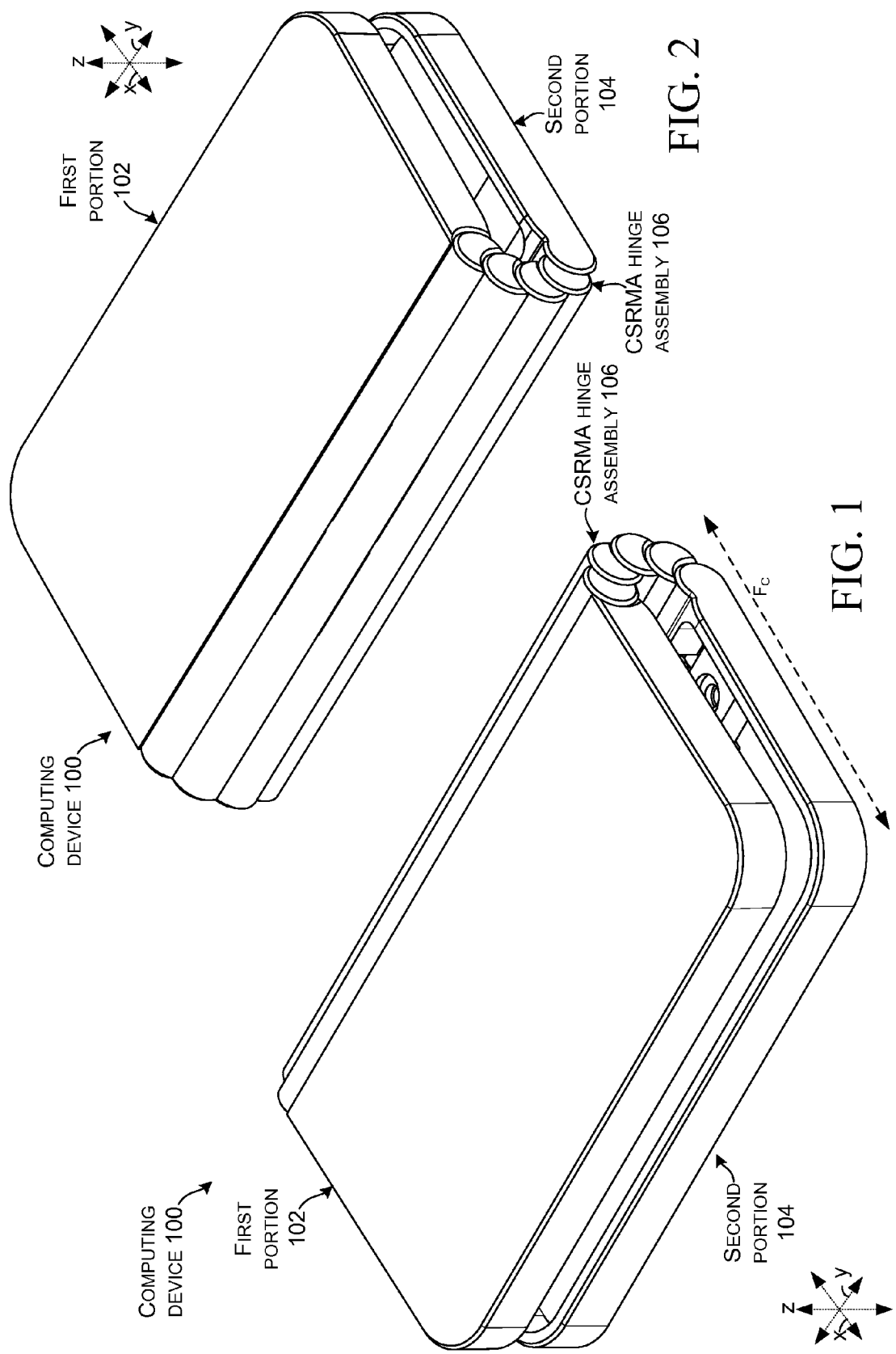

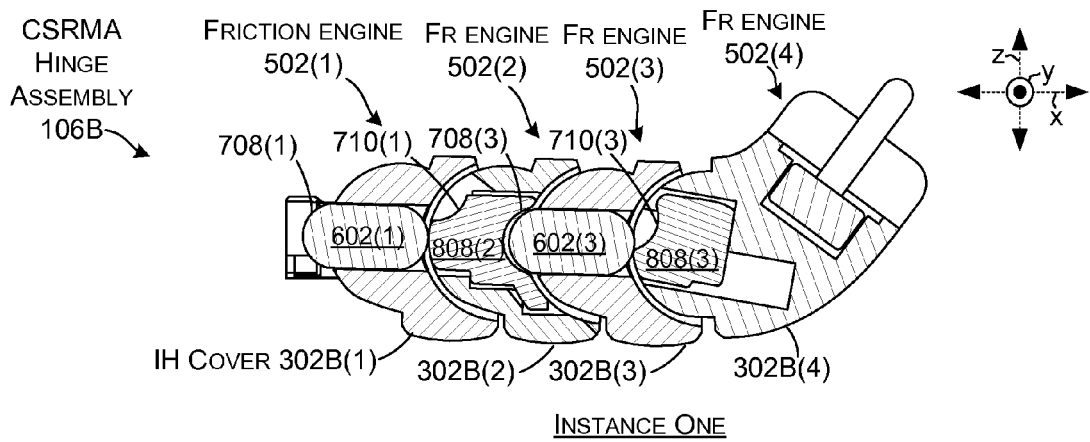
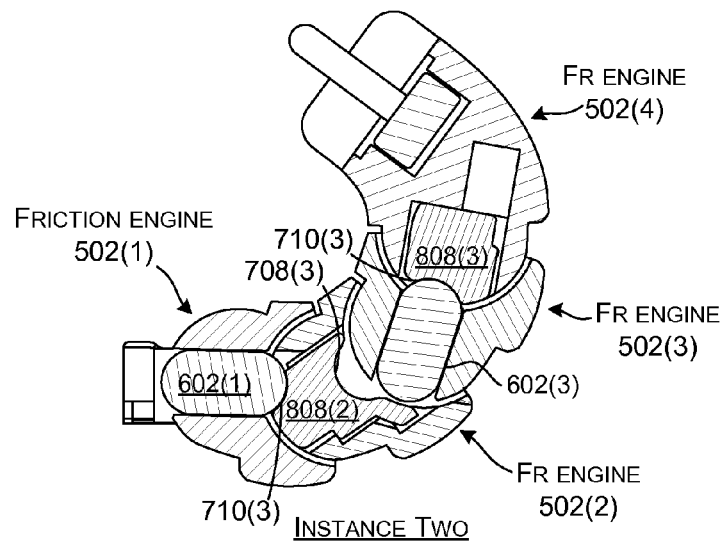
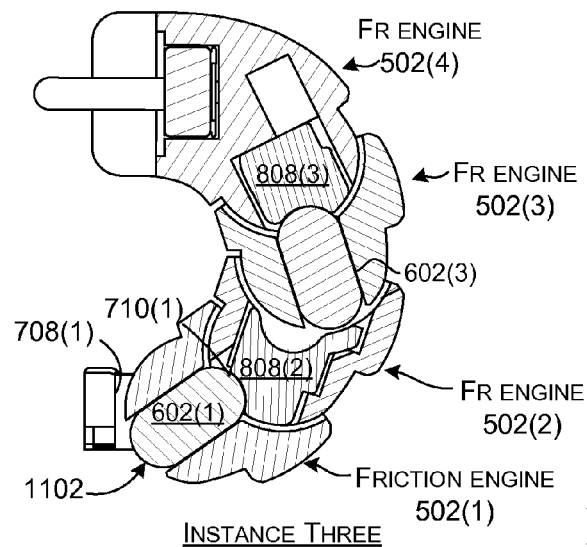
FIG. 11

COVERED MULTI-AXIS HINGE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-2 show perspective views of an example device that includes a covered, sequentially rotating, multi-axis hinge assembly example in accordance with some implementations of the present concepts.

FIGS. 11-14 are sectional views of covered, sequentially rotating, multi-axis hinge assembly examples in accordance with some implementations of the present concepts.

DESCRIPTION

The present concepts relate to devices, such as computing devices employing multi-axis or multi-pivot hinges to rotatably secure portions of the device. The multi-axis hinges can include hinge covers that can function to both protect the hinge from the user and the user from the hinge. The hinge covers can also support rotation sequencing elements that control the order of rotation within the multi-axis hinge and thus the hinge covers can be thought of as integrated with the multi-axis hinges in that they (e.g., the hinge covers) can be dual function elements that contribute to both the hinge functionality and the hinge cover functionality.

Figure 3:
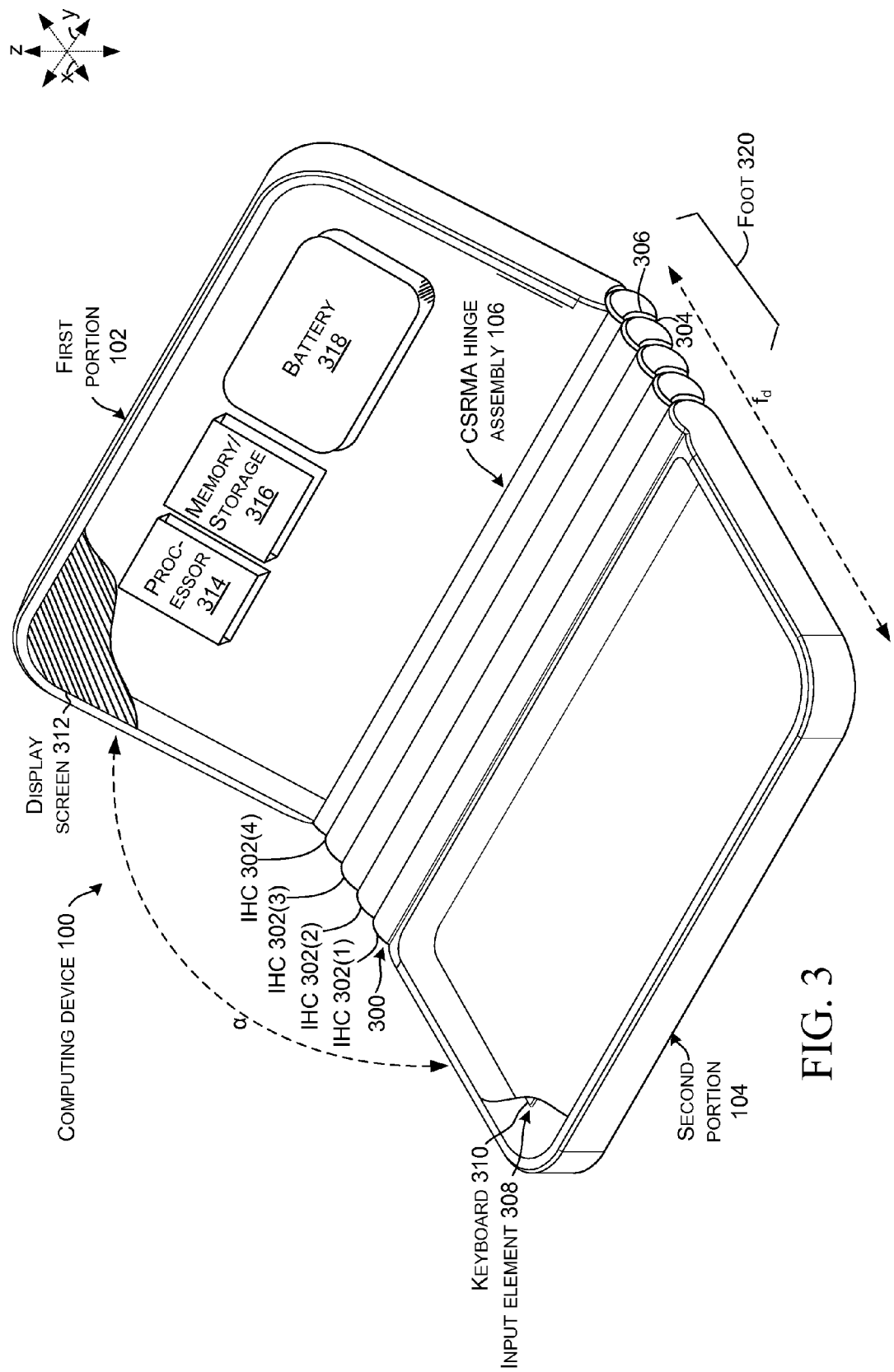
FIGS. 3-4 show partial cut-away perspective views of example devices that include covered, sequentially rotating, multi-axis hinge assembly examples in accordance with some implementations of the present concepts.

Introductory FIGS. 1-3 collectively show an example of a computing device 100. In this example, computing device 100 has first and second portions 102 and 104 that are rotatably secured together by a covered, sequentially rotating, multi-axis hinge assembly 106 (e.g., CSRMA hinge assembly). FIG. 1 shows the computing device 100 from the 'front' and FIG. 2 shows the computing device from the 'back.' FIGS. 1 and 2 show the computing device in a 'closed' or 'storage' position where the first and second portions are oriented relatively parallel to one another and juxtaposed relative to one another. In this case, the second portion 104 can be configured to be positioned on a generally horizontal surface (not specifically designated) and the first and second portions are generally parallel to one another and the horizontal surface. Note that in the closed position the CSRMA hinge assembly 106 can provide a footprint $f_c$ that is compact and easy to carry. The footprint is discussed more below relative to FIG. 3.

FIG. 3 shows a partial cut-away perspective view of computing device 100 in an 'open' or 'deployed' position. In this example, in the deployed position, the first and second portions define an obtuse (or 180 degree or more) angle α relative to one another, as opposed to an angle close to zero in the closed position of FIGS. 1-2.

Aspects of the CSRMA hinge assembly 106 are described in more detail below. The CSRMA hinge assembly can include a set of hinge covers 300. In this case, the hinge covers can be viewed as integrated hinge covers 302. In this implementation, adjacent integrated hinge covers 302 can overlap one another to obscure the underlying elements during rotation. The integrated hinge covers 302 are integrated in that they function as hinge covers that also contribute to timing the relative opening and closing order. For instance, the hinge covers can stabilize timing or sequencing elements that control the relative opening and closing order.

This example includes four integrated hinge covers 302. Other examples may include two, three, or five or more integrated hinge covers. In the illustrated configuration, individual integrated hinge covers 302 can be generally elongate (e.g., extending along a long axis relative to the y axis). Adjacent integrated hinge covers can physically interact with one another to shield underlying hinge elements during rotation.

In this case the computing device 100 can also include an input element or device 308. In this example, the input device 308 is manifest as a keyboard 310. Other implementations can employ other input devices. In this example, the computing device can also include a display screen 312, such as a touch sensitive display screen. The computing device can also include a processor 314, memory/storage 316, and/or a battery 318, among other components. These elements can be positioned in the first portion 102 and/or second portion 104.

CSRMA hinge assembly 106 can be secured to the first and second portions 102 and 104 to allow rotation therebetween. The CSRMA hinge assembly 106 can be secured to the first and second portions in a relatively permanent manner (e.g., in a manner that is not intended to be readily separable by an end use consumer). Alternatively, the CSRMA hinge assembly 106 can be secured to the first and second portions in a relatively quickly attachable/detachable manner (e.g., in a manner that is intended to be readily separable by the end use consumer). One such example of this latter configuration is described below in more detail relative to FIG. 4.

Note also, that this implementation of the CSRMA hinge assembly 106 is a progressive or sequential hinge that can increase a footprint of the computing device when the device is transitioned from the closed position of FIGS. 1-2 to the open position of FIG. 3. For example, compare the closed footprint $f_c$ to the open or deployed footprint $f_d$. This extended footprint feature can be especially valuable in this implementation where some or all of the electronic components, such as the display 312, processor 314, memory/storage 316, and battery 318 are positioned in the first portion 102. The extended footprint provided by the CSRMA hinge assembly can increase stability of the computing device and reduce the likelihood of the device tipping over backward in the deployed position from the weight of these components. This progressive or sequential nature of the CSRMA hinge assembly is described in more detail below relative to FIG. 9. Stated another way, the sequential nature of the CSRMA hinge assembly 106 can create a foot 320 in the deployed position that can help stabilize the computing device 100 and decrease tipping (e.g., maintain the center of mass over the footprint).

Figure 4:
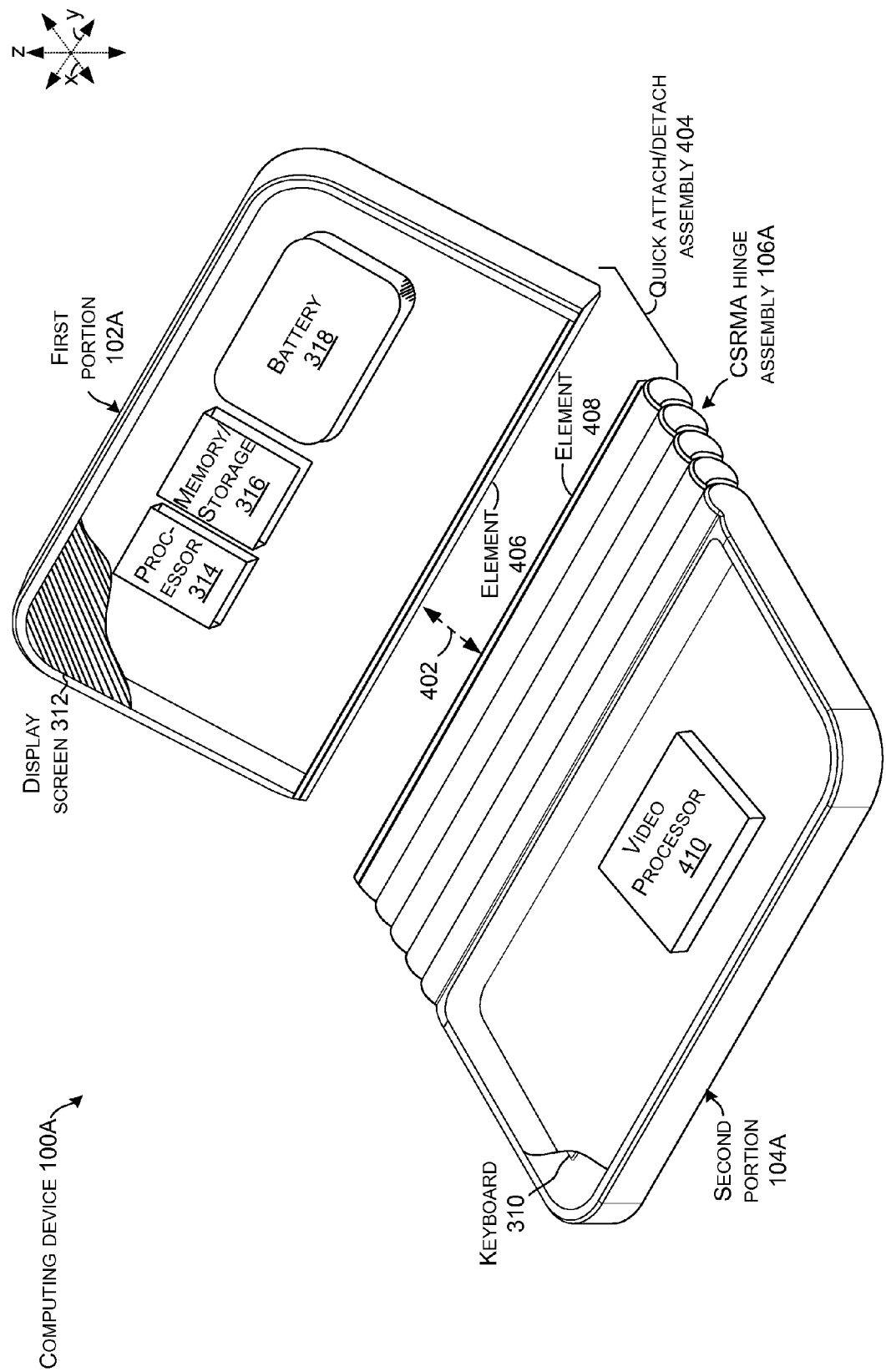

FIG. 4 shows a view that is similar to the view of FIG. 3. In this case, computing device 100A includes first and second portions 102A and 104A that are rotatably secured by CSRMA hinge assembly 106A. In this example, the CSRMA hinge assembly 106A is configured to allow an end use consumer to easily detach either or both of the first and second portions 102A and 104A from the CSRMA hinge assembly 106A as indicated by arrow 402. In this example, the CSRMA hinge assembly 106A can include a quick attach/detach assembly 404. The quick attach/detach assembly 404 may include cooperatively operating elements 406 and 408 located on the first portion 102A and the CSRMA hinge assembly 106A, respectively.

In one example, element 406 can be manifest as a latch and element 408 can be manifest as a receiver. The latch can engage the receiver to removeably couple the first portion 102A with the CSRMA hinge assembly 106A. In another example, the elements 406 and 408 may magnetically couple to one another in a manner that can be overcome by the user to separate the first portion from the CSRMA hinge assembly. Other quick attach/detach assemblies 404 are contemplated. Note further that alternatively or additionally to mechanically coupling the CSRMA hinge assembly 106A to the first and/or second portions, the quick attach/detach assembly 404 can detachably electrically couple electronic components of the first and second portions. For instance, the quick attach/detach assembly 404 may electrically couple processor 314, storage/memory 316, and/or battery 318 from the first portion 102A to a video processor 410 in the second portion 104A.

Thus, the quick attach/detach assembly 404 can allow the user to be able to detach first portion 102A or second portion 104A to use either portion independent of the other. For example, first portion 102A may be operated as a stand-alone tablet device, and then may be attached to second portion 104A via CSRMA hinge assembly 106A to form a device more akin to a laptop device. A user may also be able to exchange first portion 102A or second portion 104A for application-specific devices. For example, an individual second portion may include a keyboard and/or a touchscreen. In certain scenarios, the user may attach a first touchscreen as the first portion and a second touchscreen as the second portion, and utilize the device like a book. In other scenarios, a user may attach a touchscreen as the first portion and an input device, comprising a keyboard and trackpad, as the second portion, and utilize the device like a laptop. Other configurations and implementations are contemplated.

Figure 5:
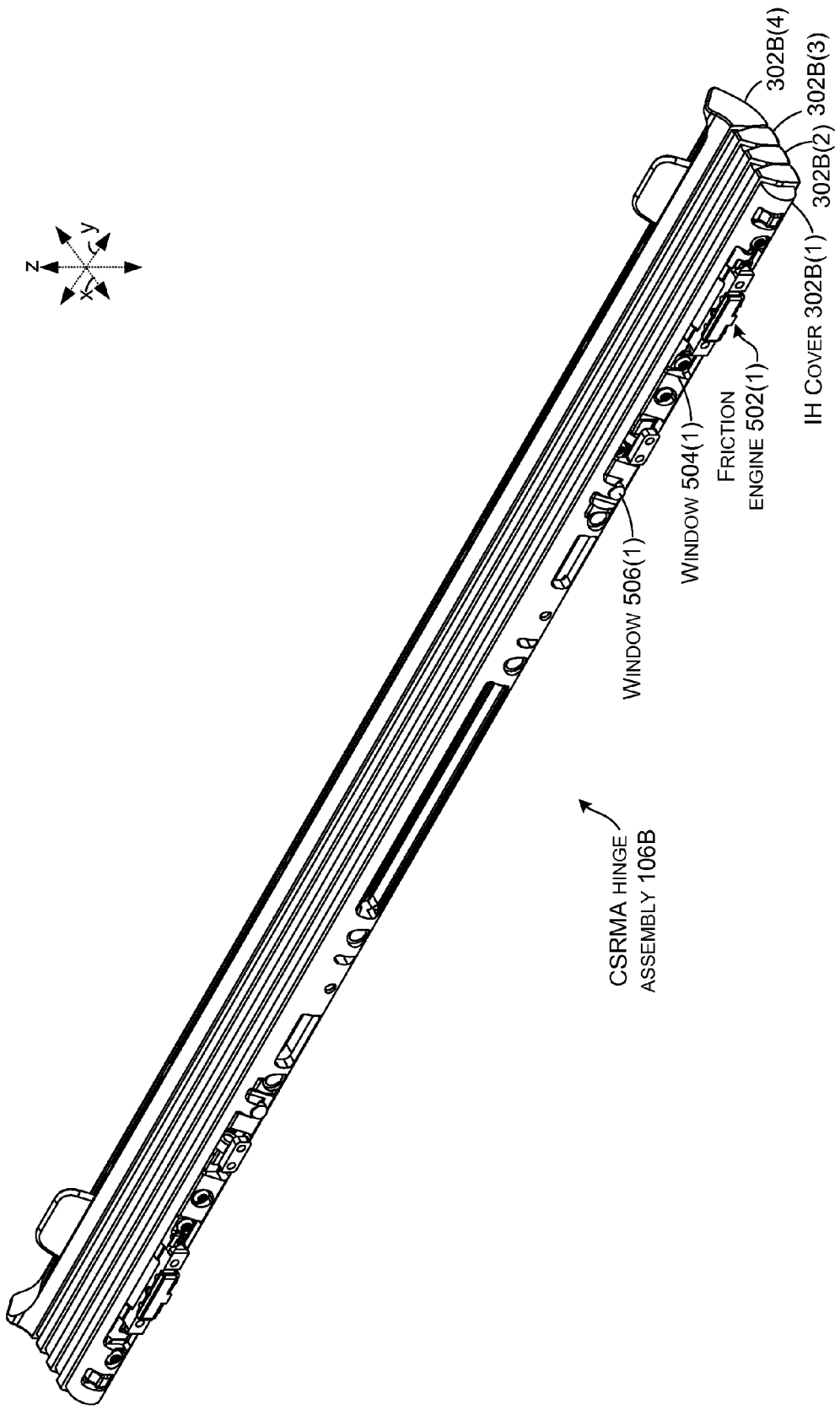
FIGS. 5-6 show perspective views of a covered, sequentially rotating, multi-axis hinge assembly example in accordance with some implementations of the present concepts.
Figure 6:
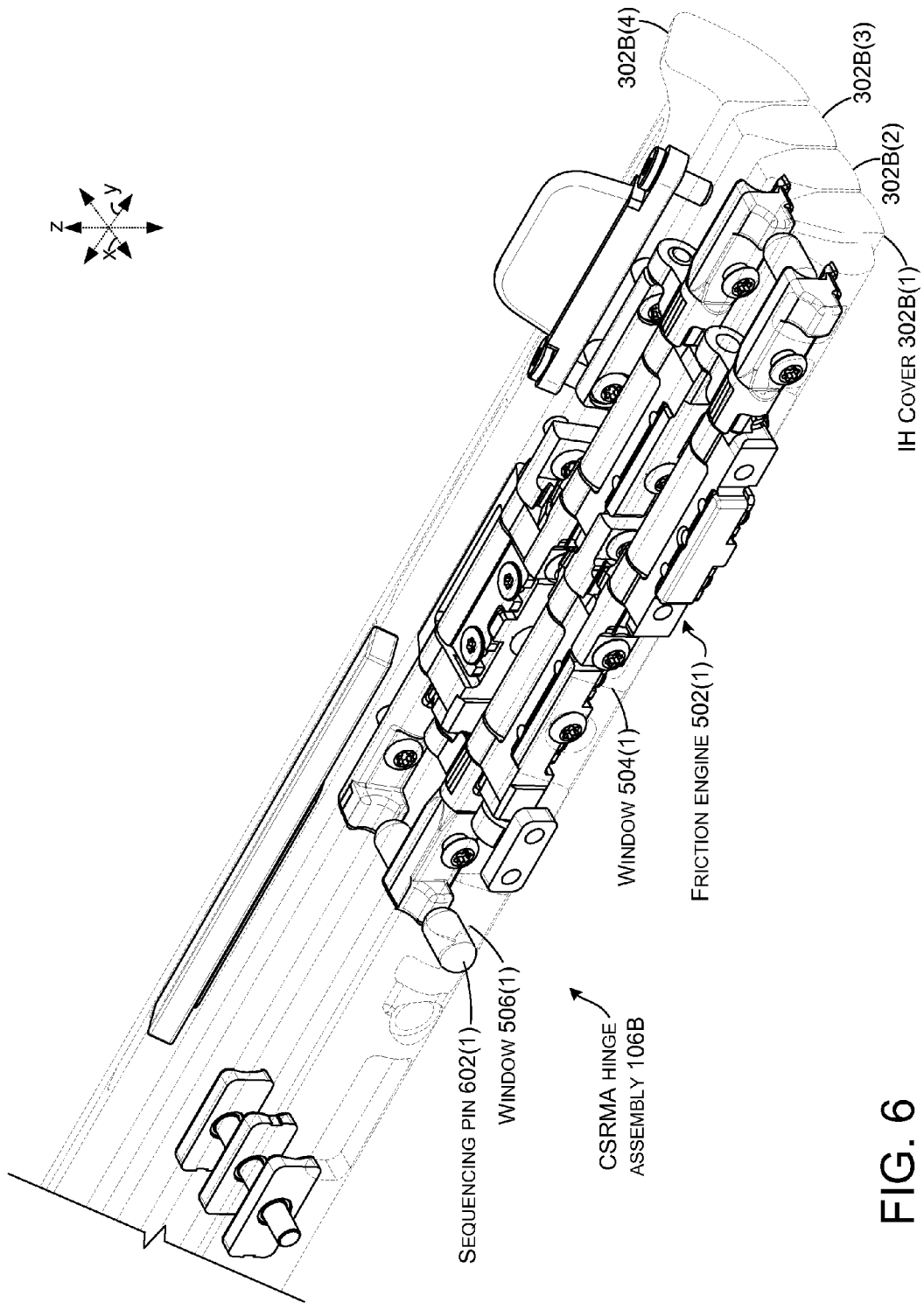
Figure 7:
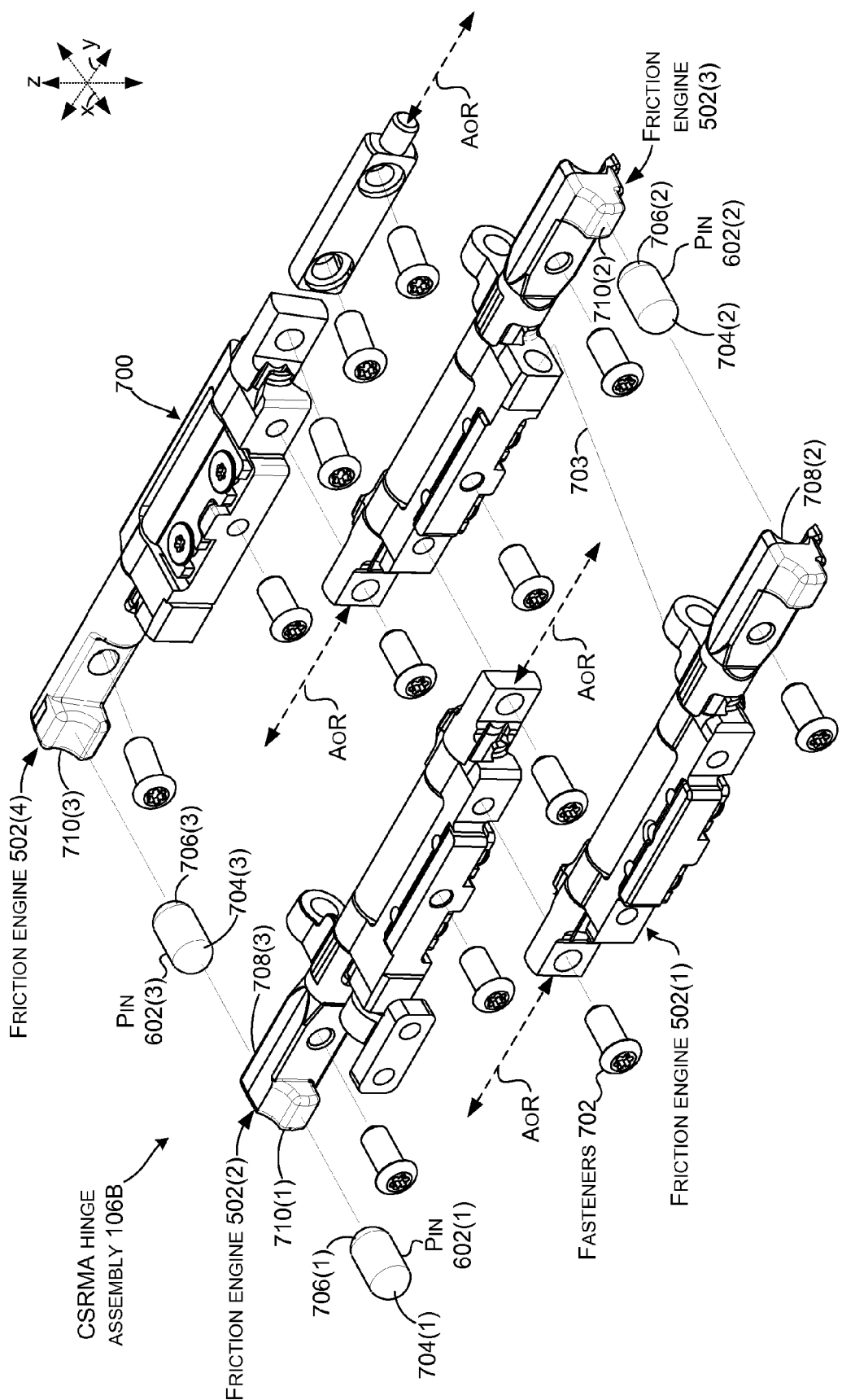
FIG. 7 shows an exploded perspective view of a covered, sequentially rotating, multi-axis hinge assembly example in accordance with some implementations of the present concepts.

FIGS. 5-7 collectively show an example CSRMA hinge assembly 106B. FIG. 5 shows the CSRMA hinge assembly 106B in the opened or deployed position similar to the view of CSRMA hinge assembly 106 (FIG. 3). FIG. 6 shows an enlarged view of a portion of CSRMA hinge assembly 106B. FIG. 7 shows an exploded view of a portion of the CSRMA hinge assembly 106B shown in FIG. 6.

FIGS. 5-6 show rotation elements manifest as friction engines 502 positioned relative to integrated hinge covers 302B. (Note that it is not practical due to space constraints on the drawing pages to designate every instance of every element. Care has been taken to label at least one instance of each element where feasible). In the illustrated configuration, integrated hinge cover 302B(1) can be secured to the second portion (104, FIGS. 1-3), while integrated hinge cover 302B(4) (e.g., receiver cover) can be secured to the first portion (102, FIGS. 1-3).

Friction engines 502 can be interconnected through window 504 in the integrated hinge covers 302B. In this implementation, window 504 can be sized to allow the friction engine contained in the respective integrated hinge cover to extend part way through the hinge cover to allow sequentially arranged friction engines to be directly connected to one another.

Another window 506 can allow sequencing elements, in the form of a timing or sequencing pin 602 (shown in FIG. 6, omitted in FIG. 5 to allow window 506 to be more readily visualized) to extend through the integrated hinge covers 302B to control an order of operation of the friction engines 502. FIG. 6 shows the integrated hinge covers in ghost so that the underlying friction engines 502 can be visualized. Further, the window 506 can allow the sequencing pins 602 to move parallel to the x reference axis to control the friction engines 502 while limiting movement of the sequencing pins in the y and z reference directions. From another perspective, the integrated hinge cover is not directly involved in controlling the operation of the friction engines, but the window 506 in the integrated hinge cover can retain the sequencing pin 602 so that the sequencing pins can reliably control operation of the friction engines.

FIG. 6 shows hinge elements, such as the friction engines 502 underlying the integrated hinge covers 302B. The integrated hinge covers effectively cover and obscure the other hinge elements. Covering the other hinge elements can protect the other hinge elements from damage, such as from a foreign object like a pen or zipper that might get caught in the hinge elements during rotation and damage the hinge elements. Similarly, without the protection offered by the integrated hinge covers, the user could get pinched by the other hinge elements during hinge rotation. Further, the integrated hinge covers can create a more aesthetically pleasing hinge appearance and thereby an overall aesthetically pleasing computing device appearance.

FIG. 7 shows friction engines 502(1)-502(4) and their respective axes of rotation (AoR) arranged as a multi-axis hinge assembly 700. The friction engines can be secured with fasteners 702. Note that the friction engines are arranged in an offset or cantilevered configuration. For instance, the left end of friction engine 502(1) is fastened to the right end of friction engine 502(2) which is in-turn fastened to the left end of friction engine 502(3), which is in-turn fastened to the right end of friction engine 502(4). The cantilevered ends of the adjacent friction engines (e.g., 502(1) and 502(3)) can be rotatably secured as indicated at 703 to stabilize the CSRMA hinge assembly 106B.

Timing or order of rotation around the individual axes of rotation can be controlled by sequencing pins 602. The sequencing pins 602 can include first and second opposing cam surfaces 704 and 706 that engage inner and outer timing or sequencing cam surfaces 708 and 710 on the friction engines.

Figure 8:
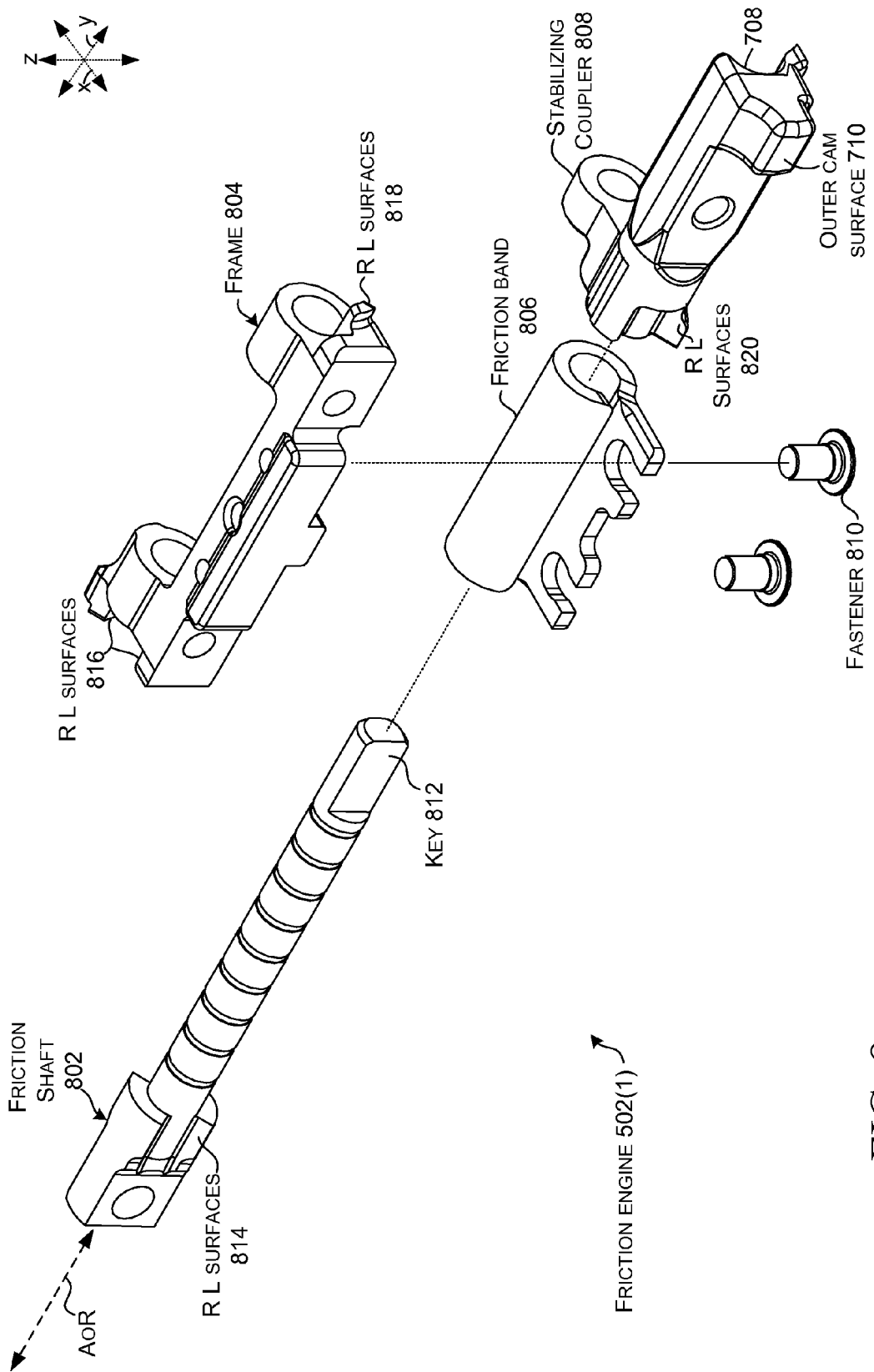
FIG. 8 shows an exploded perspective view of a portion of the covered, sequentially rotating, multi-axis hinge assembly example of FIG. 7.

FIG. 8 shows details of example friction engine 502(1). The friction engine can include a friction shaft 802 that passes through a frame 804 and a friction band 806 and is received by a stabilizing coupler 808. The friction shaft 802 can define the axis of rotation (AoR) (e.g., hinge axis) for the friction engine. The inner and outer cam surfaces 708 and 710 can be defined by the stabilizing coupler 808. The frame 804 can be secured to the friction band 806 by fasteners 810. Note that the friction shaft 802 can be keyed at 812 to interlock with the stabilizing coupler 808. The friction shaft 802 can also include rotation limiting surfaces 814 that rotatably engage corresponding rotation limiting surfaces 816 on the frame 804. Also, frame 804 can include rotation limiting surfaces 818 that rotatably engage corresponding rotation limiting surfaces 820 on the stabilizing coupler 808. These rotation limiting surfaces interact to limit the degree of rotation around an individual axis of rotation, such as 30 degrees, for example, or 50 degrees, for example. Rotation limiting surfaces are described in more detail below relative to FIG. 12-14.

The friction shaft 802, frame 804, friction band 806, and/or stabilizing coupler 808 can be made from various materials. Some implementations can utilize high-modulus materials, such as various steels, such as stainless steels for the friction shaft 802, frame 804, friction band 806, and/or stabilizing coupler 808 to form the friction engine 502(1). These friction engines when operated cooperatively can produce a very crisp or exact feeling CSRMA hinge assembly 106B (e.g., rotation stops precisely with little perceived bounce or springiness). In addition to the precise operation of these friction engines, these high modulus materials can produce strong and robust friction engines 502(1). Further, by directly securing the friction engines together and having the sequencing elements engage surfaces of the friction engines, the integrated hinge covers (302B, FIGS. 5-6) are subjected to less wear. As such, the material employed for the hinge covers can be selected for other traits, such as lightness and/or appearance.

Figure 9:
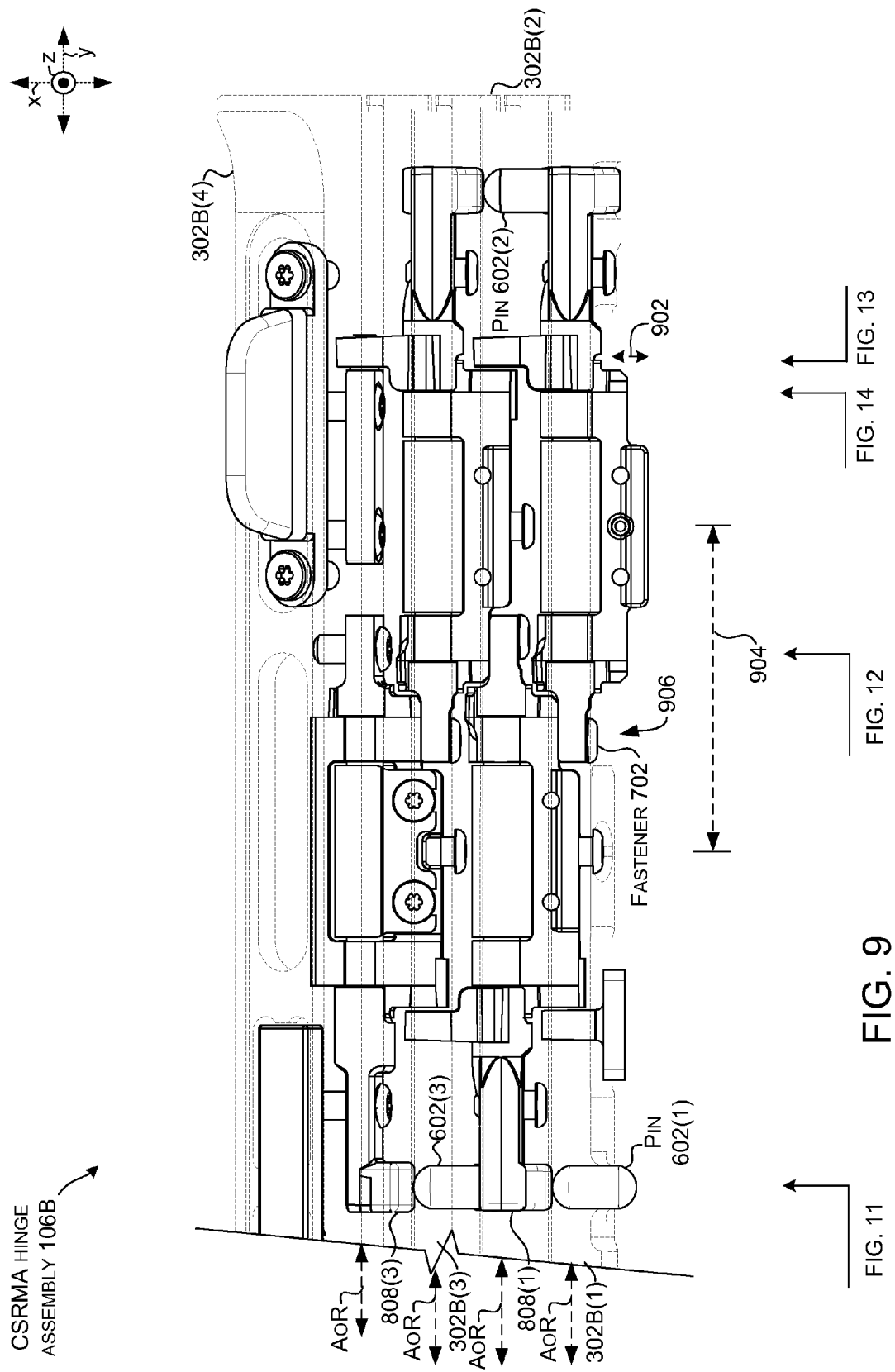
FIGS. 9-10 show elevational views of a covered, sequentially rotating, multi-axis hinge assembly example in accordance with some implementations of the present concepts.
Figure 10:
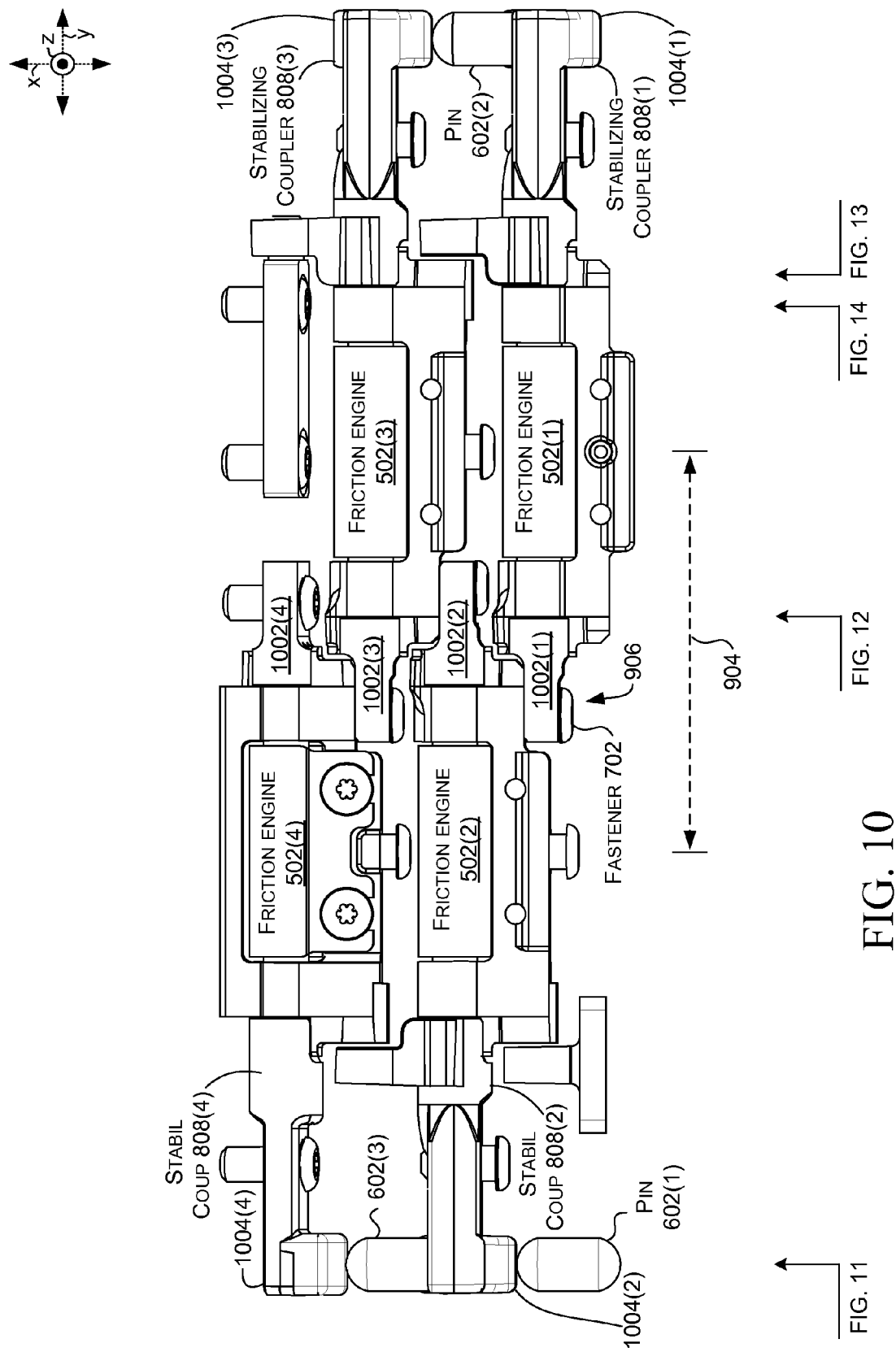

FIGS. 9 and 10 show elevational views of CSRMA hinge assembly 106B. FIG. 9 shows the CSRMA hinge assembly with the integrated hinge covers 302B. FIG. 10 does not include the integrated hinge covers. This implementation can offer a robust design by connecting adjacent friction engines directly to one another. Recall that as mentioned above relative to FIGS. 5 and 6, window 504 can allow the friction engines to protrude part way through the associated integrated hinge cover. This facet is indicated generally at 902. This configuration can reduce offset between adjacent friction engines (e.g. center to center offset) as indicated at 904 by allowing the friction engines to be directly fastened to one another as indicated generally at 906 by fastener 702 rather than spaced apart and fastened to the integrated hinge covers 302B. Such a configuration can produce very strong friction engines 502 that do not rely on the strength of other components, such as the integrated hinge covers 302B.

Further, as shown in FIG. 10, individual friction engines 502 can be viewed as having a central positioned end 1002 and an opposite distal end 1004. The friction engines are directly secured to one another at their centrally positioned ends 1002 as indicated at 906. Rather than let the distal ends 1004 cantilever in an unsupported manner, the present implementation employs the stabilizing couplers 808 on aligned distal ends (e.g., the stabilizing coupler 808(1) of friction engine 502(1) is rotatably coupled to the distal end 1004(3) of adjacent friction engine 502(3) and the stabilizing coupler 808(2) of friction engine 502(2) is rotatably coupled to the distal end 1004(4) of adjacent friction engine 502(4)) to stabilize these distal ends. Stabilizing the distal ends of the friction engines can reduce torsional effects on the CSRMA hinge assembly 106B, such as when a user grabs and rotates the corner of the first or second portion (102, 104, FIG. 3) rather than the middle.

FIGS. 11-14 show sectional views through the xz reference plane as indicated in FIGS. 9 and 10, and are discussed collectively below.

For purposes of explanation, FIG. 11 shows three instances of CRSMA hinge assembly 106B and how sequencing pins 602 and cam surfaces 708 and 710 on the stabilizing couplers 808 operate cooperatively to control the order or rotation of the friction engines 502 (e.g., function as timing or sequencing elements that control the order of rotation around individual axes of rotation relative to the other axes of rotation). (Note that due to the offset nature of the friction engines these views do not show all of the sequencing pins and cam surfaces of the CRSMA hinge assembly 106B. For example, as evidenced in FIG. 10, the views shown in FIG. 11 pass through sequencing pins 602(1) and 602(3) but sequencing pin 602(2), which is on the right side of the drawing page, is not captured in the view of FIG. 11.)

Instance One of FIG. 11 shows a deployed position similar to FIG. 3. At Instance One rotation can occur at friction engine 502(4), such as if the user pushes on the back of the first portion (102, FIG. 3) to close the device. In this case, sequencing pin 602(3) is not engaging cam surface 710(3) so rotation can occur. However, sequencing pin 602(3) is engaging cam surface 708(3) and so friction engine 502(3) is blocked in the closing direction. (Though not shown in this view, sequencing pin 602(2) is blocking rotation of friction engine 502(2)). Finally, sequencing pin 602(1) is blocking rotation of friction engine 502(1) by engaging cam surface 708(1) and being blocked from moving laterally by cam surface 710(1).

Instance Two shows an intermediate position as the CRSMA hinge assembly 106B continues from the deployed position to the closed position. At this point, cam surface 710(3) allowed sequencing pin 602(3) to move to the right so that rotation could commence on friction engine 502(3). After rotation around friction engine 502(3), rotation commenced on friction engine 502(2) until, as illustrated, sequencing pin 602(1) is able to move to the right against cam surface 710(1) thereby unlocking rotation of friction engine 502(1).

Instance Three shows rotation completed on the last friction engine (e.g. friction engine 502(1)) so that the CRSMA hinge assembly 106B is in the closed position. The order or rotation is reversed when the CRSMA hinge assembly 106B is opened (e.g., first around friction engine 502(1), then around friction engine 502(2) when friction engine 502(1) completes its rotation, then friction engine 502(3), and finally friction engine 502(4)).

From one perspective, at the point captured by Instance One, friction engine 502(4) can rotate in the counter-clockwise direction. However, sequencing pin 602(3) prevents friction engine 502(3) from rotating. Stated another way, sequencing pin 602(3) is engaging cam surface 708(3) and friction engine 502(3) cannot rotate because the sequencing pin 602(3) cannot evacuate away from cam surface 708(3). Since the sequencing pin 602(3) cannot move forward (in the positive x reference direction), engagement of the pin in the cam surface 710(3) prevents rotation of friction engine 502(3). As friction engine 502(4) rotates into alignment with the sequencing pin 602(3) (between Instance One and Instance Two) the sequencing pin 602(3) can move forward (e.g., can be cammed forward by cam surface 708(3)) to evacuate away until the pin engages cam surface 710(3). At this point the sequencing pin 602(3) is no longer blocking friction engine 502B(3) and rotation can proceed as shown in Instance Two.

Thus, from one perspective, the sequencing pins 602 in combination with cam surfaces 708 and 710 can be thought of as examples of sequencing elements 1102 that control the sequential nature of the CSRMA hinge assembly 106B (e.g., the order of rotation around the individual hinge axes).

Figure 12:
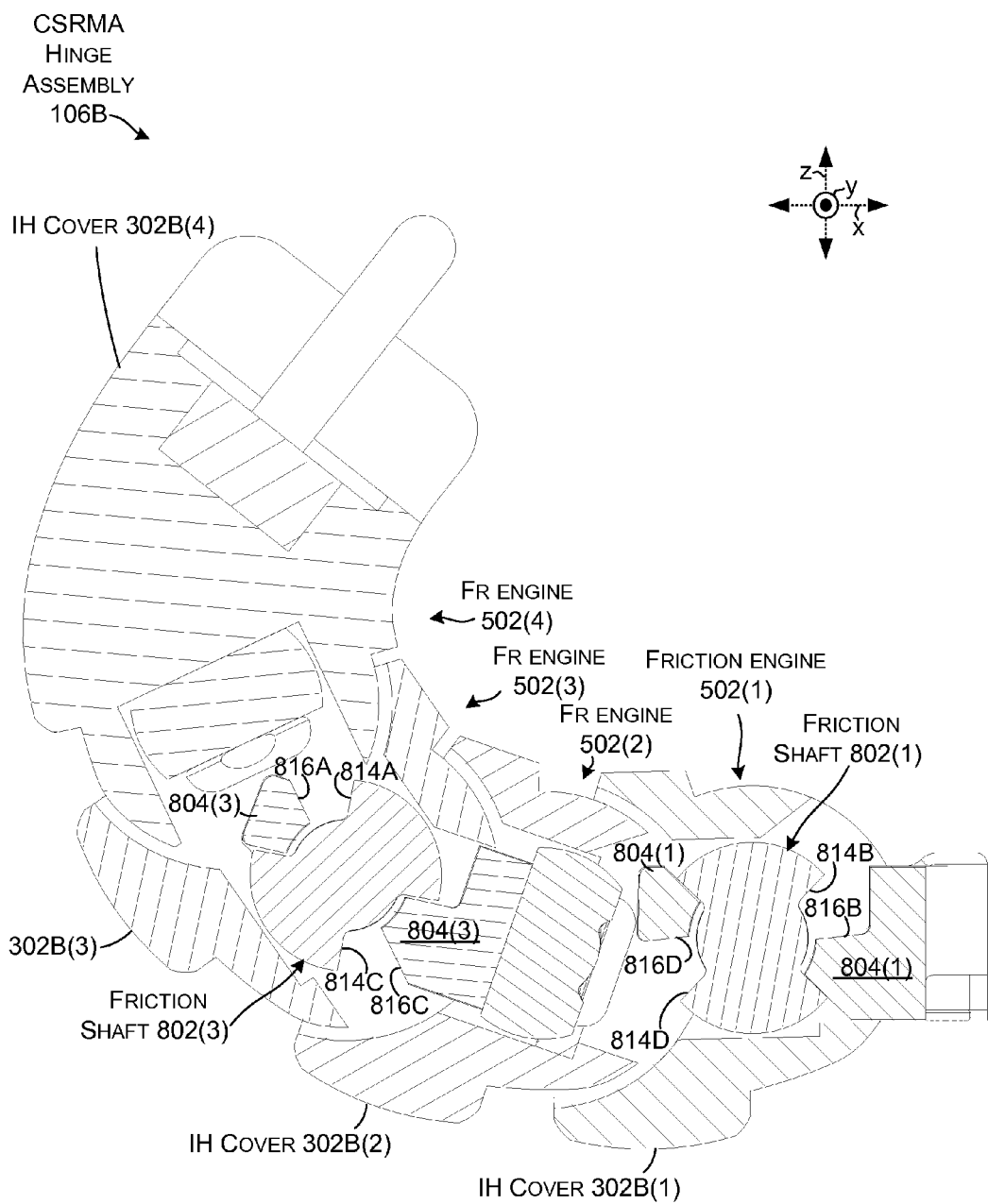
Figure 13:
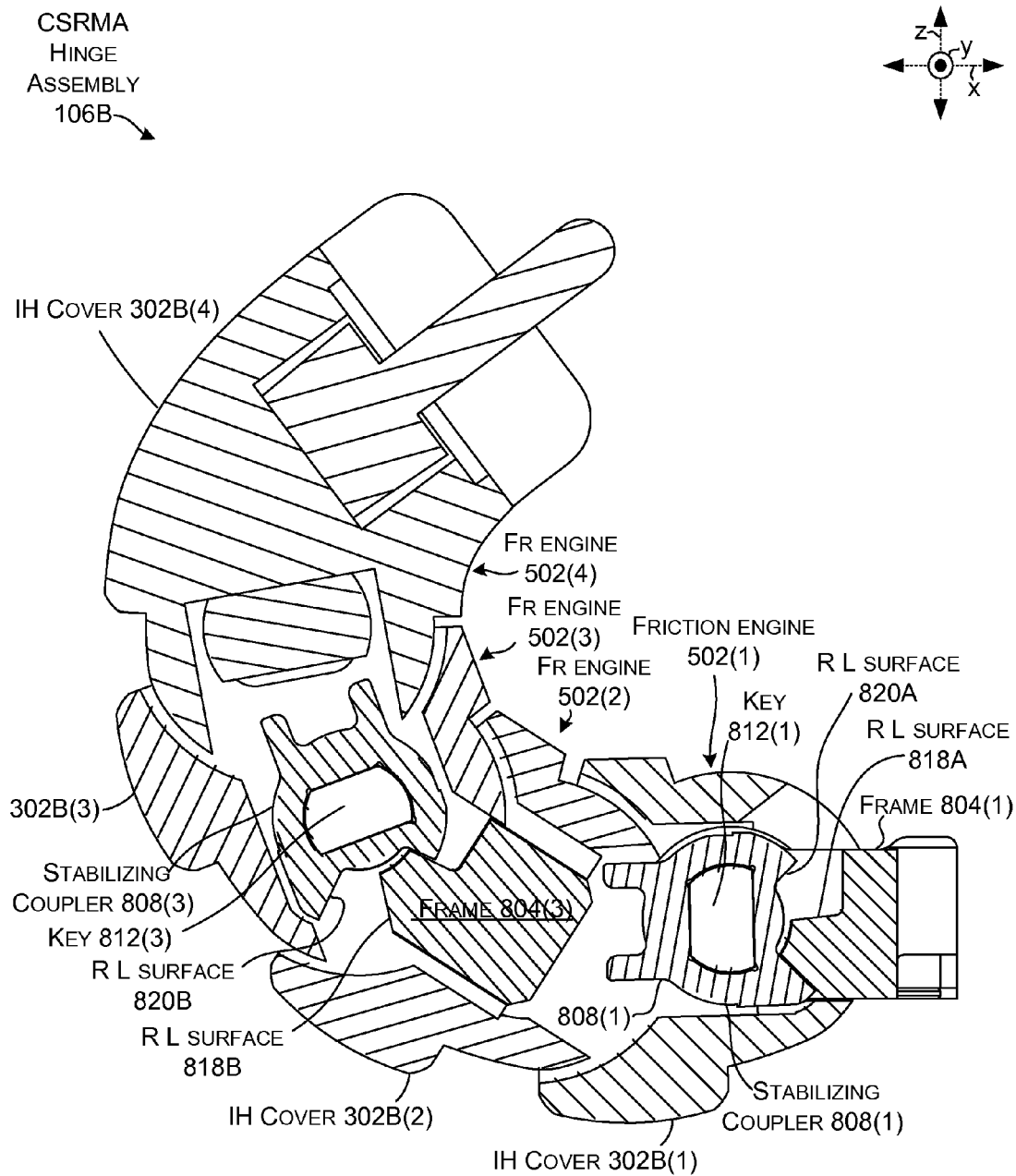
Figure 14:
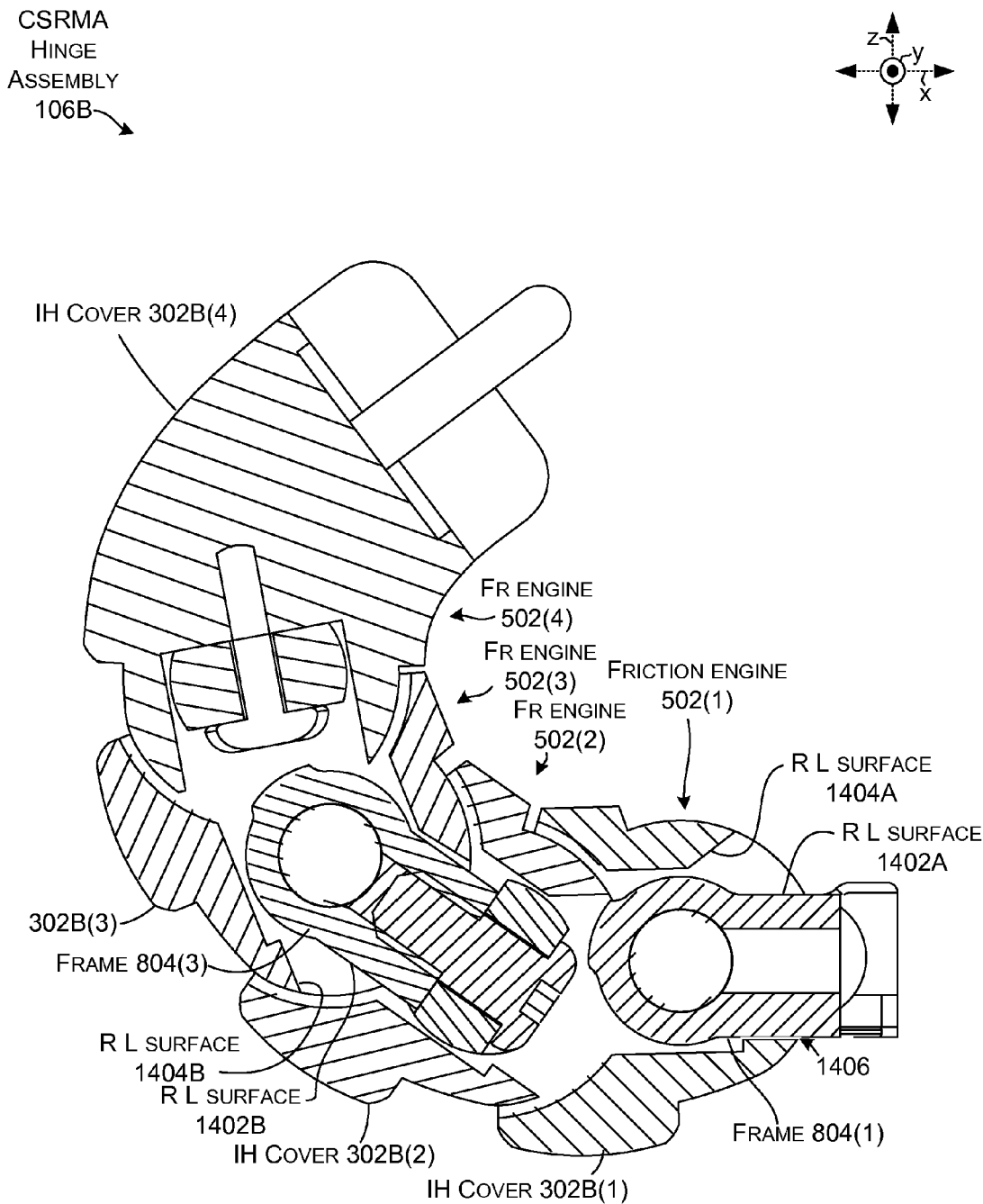

FIGS. 12-14 illustrate rotation limiting features of CRSMA hinge assembly 106B. This implementation includes multiple different sets of rotation range limiting (hereinafter, 'rotation limiting') features (e.g., elements that define the range of rotation around an individual axis of rotation). However, instead of each set of rotation limiting features engaging at the same time, in some implementations one set is configured as the primary set. The other set(s) are reserved for overload conditions. Such a configuration can offer crisp hinge stop when the hinge's rotation limit is reached and can avoid springy or bouncy use case scenarios that may be distracting to the user. In this particular implementation, the rotation limiting features described relative to FIG. 12 operate as the primary set of rotation limiting features. The rotation limiting features described relative to FIGS. 13 and 14 operate as secondary or overload stops that only engage when the CRSMA hinge assembly 106B is subjected to large forces. In other configurations the particular set of rotation limiting features that function as primary stops can be different from the illustrated configuration.

FIG. 12 shows the primary rotation limiters of CRSMA hinge assembly 106B. In this implementation, the primary rotation limiters are manifest as rotation limiting surfaces 814 on the friction shaft 802 that interact with rotation limiting surfaces 816 on the frame 804. (Note that frames 804(1) and 804(3) are designated in FIG. 12. Individual frames appear as two separate pieces, but that is a manifestation of the sectional view. Compare to FIG. 8).

Note that due to space constraints on the drawing page not all of the rotation limiting surfaces 814 and 816 are labeled relative to an individual friction engine 502. Instead, rotation limiting surfaces 814A and 814C and 816A and 816C are labeled relative to friction engine 502(3) and rotation limiting surfaces 814B and 814D and 816B and 816D are labeled relative to friction engine 502(1). Contact between rotation limiting surfaces 814A and 816A as well as 814C and 816C limits counter-clockwise rotation of the friction shaft 802(1) (e.g. of the corresponding axis of rotation). Similarly, contact between rotation limiting surfaces 814B and 816B as well as 814D and 816D limits clockwise rotation of the friction shaft 802(3) (e.g. of the corresponding axis of rotation). The angle between these surfaces defines the angle of rotation that can occur around the axis of rotation. For instance, the angle between rotation limiting surfaces 814A and 816A defines the angle of rotation. Similarly, the angles between rotation limiting surfaces 814B and 816B, 814C and 816C, and 814D and 816D can be identical to each other and can in combination with rotation limiting surfaces 814A and 816A define the angle of rotation of the CSRMA hinge assembly 106B. This combination of surfaces can provide a distinct and precise stop or limit for rotation in each direction for each friction engine (e.g., axis of rotation).

FIG. 13 shows an example of secondary rotation limiting elements (e.g. rotation limiters) of CRSMA hinge assembly 106B. In this case, the rotation limiting elements are defined by rotation limiting surface 818A on the frame 804(1) and rotation limiting surface 820A on the stabilizing coupler 808(1) and rotation limiting surface 818B on the frame 804(3) and rotation limiting surfaces 820B on the stabilizing coupler 808(3). Recall that the stabilizing coupler is non-rotationally secured to the friction shaft's key 812. In this case, the angle of rotation of an individual friction engine 502 is defined by the angle between rotation limiting surfaces 818A and 820A and 818B and 820B. Rotation in the counter-clockwise direction is stopped by rotation limiting surface 820A contacting rotation limiting surface 818A. Rotation in the clockwise direction is stopped by rotation limiting surface 820B contacting rotation limiting surface 818B. The angle or rotation can be matched to the angle or rotation defined above relative to FIG. 12. However, as mentioned, in this case, these rotation limiting features can be used as secondary rotation limiters. For example, assume that manufacturing variances of the CRSMA hinge assembly 106B produce rotation tolerances of plus or minus one degree. In such a case, the angle of rotation defined between surfaces 818A and 820A and 818B and 820B could be specified to be one to two degrees larger than the value specified for the rotation limiters of FIG. 12. For instance, if the rotation value specified for the rotation limiters of FIG. 12 is 45 degrees, the value for the angle of rotation defined between surfaces 818A and 820A and 818B and 820B could be specified at 46-47 degrees. As such, the rotation limiting surfaces of FIG. 12 should contact one another before those illustrated here. If the CRSMA hinge assembly 106B is exposed to stress forces, the angle could increase until surfaces 818A and 820A and/or 818B and 820B contact one another to provide additional rotation limitation. Stated another way, though stabilizing couplers' rotation limiting surfaces appear to be contacting the frames' rotation limiting surfaces, the surfaces can actually be about one degree apart under normal (e.g., non-overloaded) conditions.

FIG. 14 shows another example of secondary rotation limiting elements of CRSMA hinge assembly 106B. In this case, the rotation limiting elements are defined by rotation limiting surfaces 1402A and 1402B of the frames 804 and inside surface 1404A and 1404B of the integrated hinge covers 302B. Again not all instances of each surface are labeled due to space constraints on drawing page. For example, rotation limiting surfaces 1402A and 1404A are designated relative to friction engine 502(1) and rotation limiting surfaces 1402B and 1404B are labelled relative to friction engine 502(3). As mentioned above, when employed as secondary rotation limiters these elements can stop about one degree from each other as indicated at 1406 rather than contacting one another, since the rotation limiters of FIG. 12 engage before these do. Overload conditions can cause additional rotation that causes the rotation limiting surfaces of FIGS. 13 and 14 to contact one another to resist further rotation which could damage the CRSMA hinge assembly 106B. Thus, by employing a primary set of rotation limiters (e.g., FIG. 12) the CSRMA hinge assembly can provide a crisp clean rotational stop. By relying on this primary set of rotation limiters under normal operating conditions, the CSRMA hinge assembly can reduce bounce or oscillation when a user touches the first portion (102, FIGS. 1-4), or when the device experiences external accelerations, such as when used in a moving vehicle. However, the CSRMA hinge assembly is robust in that when subjected to large forces (e.g., overloaded), the secondary or overload rotation limiters (e.g., FIGS. 13 and 14) can engage to protect the CSRMA hinge assembly from damage.

Individual elements of the CSRMA hinge assembly 106 can be made from various materials, such as sheet metals, die cast metals, machined metals, 3D printed materials, and/or molded plastics, among others, or any combination of these materials.

CSRMA hinge assemblies can be utilized with any type of computing device, such as but not limited to notebook computers, smart phones, wearable smart devices, and/or other types of existing, developing, and/or yet to be developed computing devices.

EXAMPLE METHODS

Various methods of manufacture, assembly, and use for CSRMA hinge assemblies are contemplated beyond those shown above relative to FIGS. 1-14.

ADDITIONAL EXAMPLES

Various examples are described above. Additional examples are described below. One example is manifest as a computing device that can include a first portion and a second portion and a multi-axis hinge assembly comprising multiple friction engines, rotation of individual friction engines controlled by sequencing elements extending therebetween. The example can also include elongate covers extending over individual friction engines and stabilizing the sequencing elements.

Another example can include any combination of the above and/or below examples where an individual sequencing element includes a first end that engages camming surfaces on a first individual friction engine and a second opposite end that engages camming surfaces on a second individual friction engine.

Another example can include any combination of the above and/or below examples where the friction engines are oriented in an alternating offset cantilevered relationship and further comprising stabilizing couplers that rotatably secure pairs of friction engines to stabilize the multi-axis hinge assembly.

Another example can include any combination of the above and/or below examples where the stabilizing couplers include cam surfaces that engage the sequencing elements to control the rotation sequence of the friction engines.

Another example can include any combination of the above and/or below examples where adjacent friction engines are directly secured to one another.

Another example can include any combination of the above and/or below examples where the friction engines and the sequencing elements are comprised of similar high modulus materials.

Another example can include any combination of the above and/or below examples where the friction engines and the sequencing elements are comprised of the same material.

Another example can include any combination of the above and/or below examples where the same material is stainless steel.

Another example can be manifest as a computing device that includes a first portion that includes a display screen, a second portion that includes an input device, and a covered sequentially rotating multi-axis hinge assembly. The sequentially rotating multi-axis hinge assembly comprises first, second, and third rotationally coupled and timed friction engines. The second friction engine can be cantilevered from the first and third friction engines and further comprises a stabilizing coupler that rotatably stabilizes the first friction engine and the third friction engine.

Another example can include any combination of the above and/or below examples further comprising a fourth friction engine that is rotationally coupled to the third friction engine and cantilevered in line with the second friction engine.

Another example can include any combination of the above and/or below examples where the coupler comprises cam surfaces that work cooperatively with a sequencing pin to control an order of sequential rotation of the first, second, and third friction engines.

Another example can include any combination of the above and/or below examples where the friction engines further comprise multiple sets of rotation limiters that control a range of angular rotation of individual friction engines.

Another example can include any combination of the above and/or below examples where the multiple sets of rotation limiters comprise a primary set of rotation limiters that engage to define the range of angular rotation and a second set of overload rotation limiters that only engage when excessive force is applied to the first and second portions that overloads the primary set of rotation limiters.

Another example can include any combination of the above and/or below examples where the multiple sets of rotation limiters are configured to engage simultaneously.

Another example can include any combination of the above and/or below examples where the multiple sets of rotation limiters are configured to engage at different angles of rotation from one another.

Another example can include any combination of the above and/or below examples further comprising overlapping integrated hinge covers that protect the friction engines and where at least one set of the multiple sets of rotation limiters is partially defined by the overlapping integrated hinge covers.

Another example is manifest as a computing device that includes a first portion and a second portion, multiple interconnected friction engines, and sequencing elements. The multiple interconnected friction engines secure the first portion and the second portion. An individual friction engine can define an axis of rotation of the first portion relative to the second portion. The sequencing elements can control a relative order of rotation of the multiple interconnected friction engines. The overlapping hinge covers can protect the multiple interconnected friction engines and stabilize the timing elements.

Another example can include any combination of the above and/or below examples where the individual friction engine extends through a window in an individual hinge cover and is directly secured to a next sequentially arranged individual friction engine.

Another example can include any combination of the above and/or below examples where the friction engines are directly secured to one another in an offset sequential relationship.

Another example can include any combination of the above and/or below examples where the sequencing elements and the friction engines comprise high modulus materials, and the hinge covers comprise low modulus materials.

Another example can include any combination of the above and/or below examples where the sequencing elements pass through windows in the hinge covers and where the hinge covers stabilize the sequencing elements by only allowing the sequencing elements to move along a single axis that is perpendicular to a length of the hinge covers.

CONCLUSION

Although techniques, methods, devices, systems, etc., pertaining to covered hinge assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
    a first portion and a second portion;
    a multi-axis hinge assembly comprising multiple friction engines, rotation of individual friction engines controlled by sequencing elements extending therebetween; and,
    elongate covers extending over individual friction engines and stabilizing the sequencing elements, adjacent friction engines directly secured to one another through windows in the elongate covers, and the sequencing elements move through the windows.

2. The computing device of claim 1, wherein an individual sequencing element includes a first end that engages camming surfaces on a first individual friction engine and a second opposite end that engages camming surfaces on a second individual friction engine.

3. The computing device of claim 2, wherein the friction engines are oriented in an alternating offset cantilevered relationship and further comprising stabilizing couplers that rotatably secure pairs of friction engines to stabilize the multi-axis hinge assembly.

4. The computing device of claim 3, wherein the stabilizing couplers include cam surfaces that engage the sequencing elements to control rotation sequence of the friction engines.

5. The computing device of claim 1, wherein the sequencing elements move through the windows in a direction that is perpendicular to a length of the elongate covers.

6. The computing device of claim 1, wherein the friction engines and the sequencing elements comprise similar high modulus materials.

7. The computing device of claim 6, wherein the friction engines and the sequencing elements comprise the same material.

8. The computing device of claim 7, wherein the same material is stainless steel.

9. A computing device, comprising:
    a first portion that includes a display screen and a second portion that includes an input device; and,
    a covered sequentially rotating multi-axis hinge assembly comprising first, second, and third rotationally coupled and timed friction engines, the second friction engine cantilevered from the first and third friction engines and further comprising a stabilizing coupler that rotatably stabilizes the first friction engine and the third friction engine, the first friction engine extending through a window in an individual hinge cover and directly secured to the second friction engine.

10. The computing device of claim 9, further comprising a fourth friction engine that is rotationally coupled to the third friction engine and cantilevered in line with the second friction engine.

11. The computing device of claim 9, wherein the stabilizing coupler comprises cam surfaces that work cooperatively with a sequencing pin to control an order of sequential rotation of the first, second, and third friction engines.

12. The computing device of claim 9, wherein the friction engines further comprise multiple sets of rotation limiters that control a range of angular rotation of individual friction engines.

13. The computing device of claim 12, wherein the multiple sets of rotation limiters comprise a primary set of rotation limiters that engage to define the range of angular rotation and a second set of overload rotation limiters that only engage when excessive force is applied to the first and second portions that overloads the primary set of rotation limiters.

14. The computing device of claim 12, wherein the multiple sets of rotation limiters are configured to engage simultaneously.

15. The computing device of claim 12, wherein the multiple sets of rotation limiters are configured to engage at different angles of rotation from one another.

16. The computing device of claim 12, further comprising overlapping integrated hinge covers that protect the friction engines and wherein at least one set of the multiple sets of rotation limiters is partially defined by the overlapping integrated hinge covers.

17. A computing device, comprising:
    a first portion and a second portion;
    multiple interconnected friction engines that secure the first portion and the second portion, an individual friction engine defining an axis of rotation of the first portion relative to the second portion;
    sequencing elements that control a relative order of rotation of the multiple interconnected friction engines; and,
    overlapping hinge covers protecting the multiple interconnected friction engines and stabilizing the sequencing elements, the individual friction engine extending through a window in an individual hinge cover and directly secured to a next sequentially arranged individual friction engine.

18. The computing device of claim 17, wherein the friction engines are directly secured to one another in an offset sequential relationship.

19. The computing device of claim 17, wherein the sequencing elements and the friction engines comprise high modulus materials and the hinge covers comprise low modulus materials.

20. The computing device of claim 17, wherein the hinge covers stabilize the sequencing elements by only allowing the sequencing elements to move along a single axis that is perpendicular to a length of the hinge covers.

* * * * *